(12) United States Patent
Allen et al.

(10) Patent No.: US 7,413,656 B2
(45) Date of Patent: Aug. 19, 2008

(54) AEROBIC SEWAGE SYSTEM

(75) Inventors: Douglas M. Allen, Bradenton, FL (US); Thomas W. Olson, Huntington, WV (US); Carl E. Miller, Huntington, WV (US)

(73) Assignee: Mor-Air Inc., Ironton, OH (US)

( * ) Notice: Subject to any disclaimer, the term of this patent is extended or adjusted under 35 U.S.C. 154(b) by 0 days.

(21) Appl. No.: 11/399,200

(22) Filed: Apr. 6, 2006

(65) Prior Publication Data
US 2006/0226071 A1   Oct. 12, 2006

Related U.S. Application Data

(60) Provisional application No. 60/669,181, filed on Apr. 7, 2005.

(51) Int. Cl.
*C02F 3/22* (2006.01)

(52) U.S. Cl. .............. 210/622; 210/629; 210/791; 210/195.1; 210/256; 210/415

(58) Field of Classification Search .......... 210/620, 210/622, 629, 791, 797, 194, 195.1, 202, 210/219, 256, 415, 532.2
See application file for complete search history.

(56) References Cited

U.S. PATENT DOCUMENTS

| | | | | |
|---|---|---|---|---|
| 3,662,890 A | * | 5/1972 | Grimshaw | 210/195.1 |
| 3,770,624 A | * | 11/1973 | McKibben et al. | 210/622 |
| 4,021,347 A | * | 5/1977 | Teller et al. | 210/195.1 |
| 4,070,292 A | * | 1/1978 | Adams | 210/195.1 |
| 4,608,157 A | * | 8/1986 | Graves | 210/532.2 |
| 4,620,925 A | * | 11/1986 | Allen | 210/219 |
| 5,080,788 A | * | 1/1992 | Chen | 210/415 |
| 5,451,316 A | * | 9/1995 | Allen | 210/532.2 |
| 5,690,824 A | * | 11/1997 | Stuth | 210/532.2 |
| 5,720,875 A | * | 2/1998 | Stegall et al. | 210/532.2 |
| 6,231,764 B1 | * | 5/2001 | Wilkins | 210/532.2 |
| 2003/0085182 A1 | * | 5/2003 | Wilkins et al. | 210/532.2 |

* cited by examiner

*Primary Examiner*—Christopher Upton
(74) *Attorney, Agent, or Firm*—Jos. G. Nauman

(57) ABSTRACT

An aerobic system provided to treat sewage generated by a modern larger home which does not have access to a municipal sewage connection The features of this system are adaptable to upgrade and/or replace existing systems. In a preferred embodiment the system uses two 1000 gallon tanks, a first pretreatment tank to receive raw sewage, remove settleable and floatable solids from the sewage, and discharge into a second tank in which the pool of sewage is aerated. The second tank contains a motor driven aerator and a unique self-cleaning filter driven by an outgoing liquid stream from the aerator. After passing through the filter, the liquid is then discharged into a leaching field or nearby stream as permitted by the proper regulatory agency. The self-cleaning rotating filter features a rotating drive energized from the pressurized stream of liquid ejecting from the aerator and impinging upon a side of the filter structure (similarly to a paddle wheel), rotating the filter assembly about its supporting tube as the stream enters spaces between blades of the filter structure, also impinging upon, and passing through a filter cloth, leaving particulate matter on the impinged side of the cloth to be brushed away into the pool of sewage undergoing aeration, during rotation of the filter structure.

8 Claims, 5 Drawing Sheets

US 7,413,656 B2

AEROBIC SEWAGE SYSTEM

RELATED APPLICATION

This application is based upon U.S. Provisional Patent Application Ser. No. 60/669,181 filed 7 Apr. 2005, the priority date of which is hereby claimed. In addition, the entire content of such prior application is hereby incorporated herein by reference.

FIELD OF THE INVENTION

The aerobic system of the present invention has been developed to treat the sewage generated from the kitchen, laundry and baths at the typical modern home. The design flow of 500 gallons per day has the capacity to treat the daily single dwelling discharge. Based upon time proven principles with innovative design features, the system is easy to operate, requiring only minimum maintenance

BACKGROUND OF THE INVENTION

U.S. Pat. No. 4,620,925 issued 4 Nov. 1986, which is assigned to the assignee of this application, discloses an earlier version of an aerating unit for incorporation in an aerobic sewage treatment system. U.S. Pat. No. 5,451,316 issued 19 Sep. 1995, also assigned to the assignee of this application, discloses a later invented combination of the aerating unit into a single tank aerobic system in which one or more directed streams from the aerating unit are arranged to achieve a desired flow of aerated effluent returning from a settling chamber into the aerobic treatment chamber.

SUMMARY OF THE INVENTION

This aerobic system provided by this invention is intended to treat the sewage generated by a modern larger home which does not have access to a municipal sewage connection (sanitary sewer line). The features of this invention are readily adaptable to upgrade and/or replace many existing. In its preferred embodiment the system uses two 1000 gallon tanks. The first (pretreatment) tank receives raw sewage from a residence or other source, removes settleable and floatable solids from the sewage, and discharges into a second tank that is aerated.

The second tank contains a motor driven aerator, such as basically described in U.S. Pat. No. 4,620,925, and a unique rotating filter which is driven by the outgoing liquid stream from the aerator. After passing through the filter, the liquid is then discharged into a leaching field or nearby stream as permitted by the proper regulatory agency. The present invention features the rotating filter and its rotating drive that is derived from the pressurized stream of liquid ejecting from the aerator and impinging upon the side of the filter structure in a manner, similar to a paddle wheel, which rotates the filter assembly about its supporting shaft while the stream enters the spaces between the blades of the filter structure, provides energy to move the blades and also to impinge upon, and through, the filter cloth leaving particulate matter on the cloth to be scraped away during rotation of the filter structure.

DESCRIPTION OF THE PREFERRED EMBODIMENT

Figure 1:
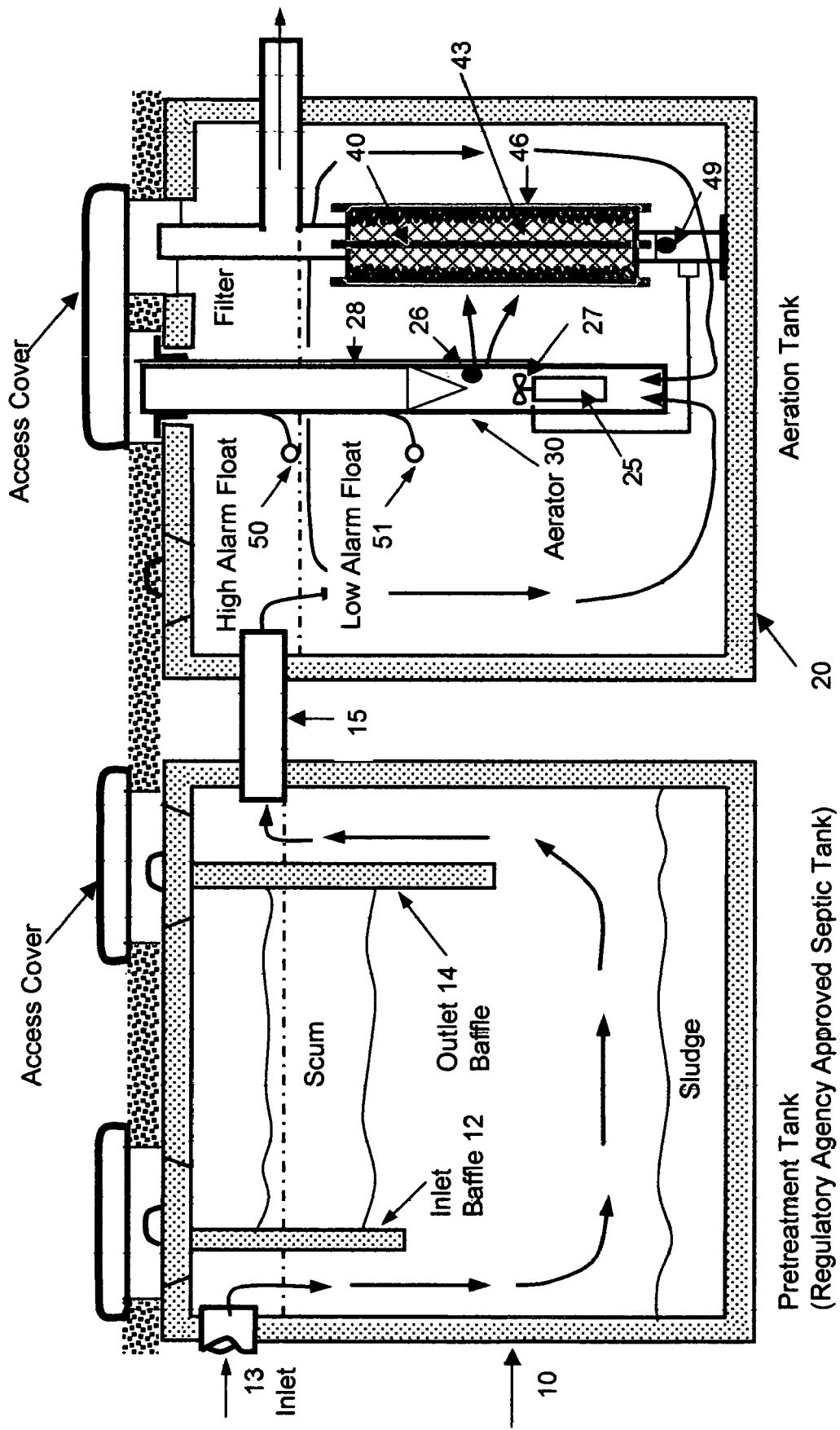
FIG. 1 is a general cross-sectional view of a system as provided by the invention, including separate pretreatment and aeration tanks.

The aerobic system provided by the present invention consists of two tanks. The first is a regulatory agency approved 1000 gallon septic tank 10. The second is an aeration tank 20 which (in the illustrated embodiment) is constructed from a modified regulatory agency approved 1000 gallon septic tank. These tanks have greater volume, as compared to prior systems, and can easily treat the system design flow of 500 gallons per day. Tank 20 contains an aerator unit 30 which is an updated version of the aerator disclosed in U.S. Pat. No. 4,620,925. Unlike many other systems, this system does not have a settling chamber in the aeration tank, such as described in said U.S. Pat. No. 5,451,316. It has been discovered that solids accumulate in these settling compartments rather rapidly, depending on usage, and may go septic, resulting in a poorly treated discharge flow. Like all other home sewage treatment systems, this new system must be full of water to operate. After installation and after each time the system (either tank) is pumped, it is necessary to fill them with clean water until water leaves the aeration tank.

The septic (pretreatment) tank 10 removes floatable and settleable solids from the sewage. The inlet baffle 12 in this tank slows the in-flow from inlet sewer pipe 13, allowing heavy material to settle to the tank bottom and forming sludge. Light solids float to the top creating a layer of scum. The outlet baffle 14 keeps the scum in the tank, preventing it from exiting tank 10 via the outflow pipe 15 and then entering aeration tank 20. The septic or pretreatment tank collects about one third of the organic material from the incoming sewage, thereby protecting the aerator and filter unit in the aeration tank from grease, heavy paper, hair, and the like. This reduces the amount of energy needed to treat the sewage, extends the life of the aerator, and reduces maintenance. The septic (pretreatment) tank will require periodic inspection and pumping (described later). For easy access, it is highly recommended that the cover over the outlet baffle be within one foot of the surface and referenced so that it can be easily located for access to the tank.

From the septic tank 10, the sewage flows to aeration tank 20 where it is further treated so that it can be safely discharged to a tile field or directly to a stream as permitted by a regulatory agency. In the aeration tank, aerobic microorganisms consume the remaining organic material. The efficiency of the treatment process is dependent upon mixing the liquid so the organic material is in contact with the microorganisms and air so that the process remains aerobic, resulting in minimized foul odor and a clear discharge.

The aerator is powered by a ⅓ horsepower, single phase, 115 volt, submersible & fully insulated, induction type motor 25. The system can be located near the home without causing annoying noise. The aerator 30 is constructed of non-corrosive material. Air is drawn down a small tube 28 and is mixed with the liquid near the impeller 27. Water enters at the bottom, flows upward, is aerated and deflected so as to exit horizontally through an array of ports 26. The discharge from the larger port is directed at the top of the filter unit 40. The flow from the smaller ports is directed progressively closer to the mid-section of filter 40. Effluent from these ports provides both some of the energy to actuate filter unit 40 and also creates the circulating continuous flow of aerated liquid within tank 20.

Figure 2:
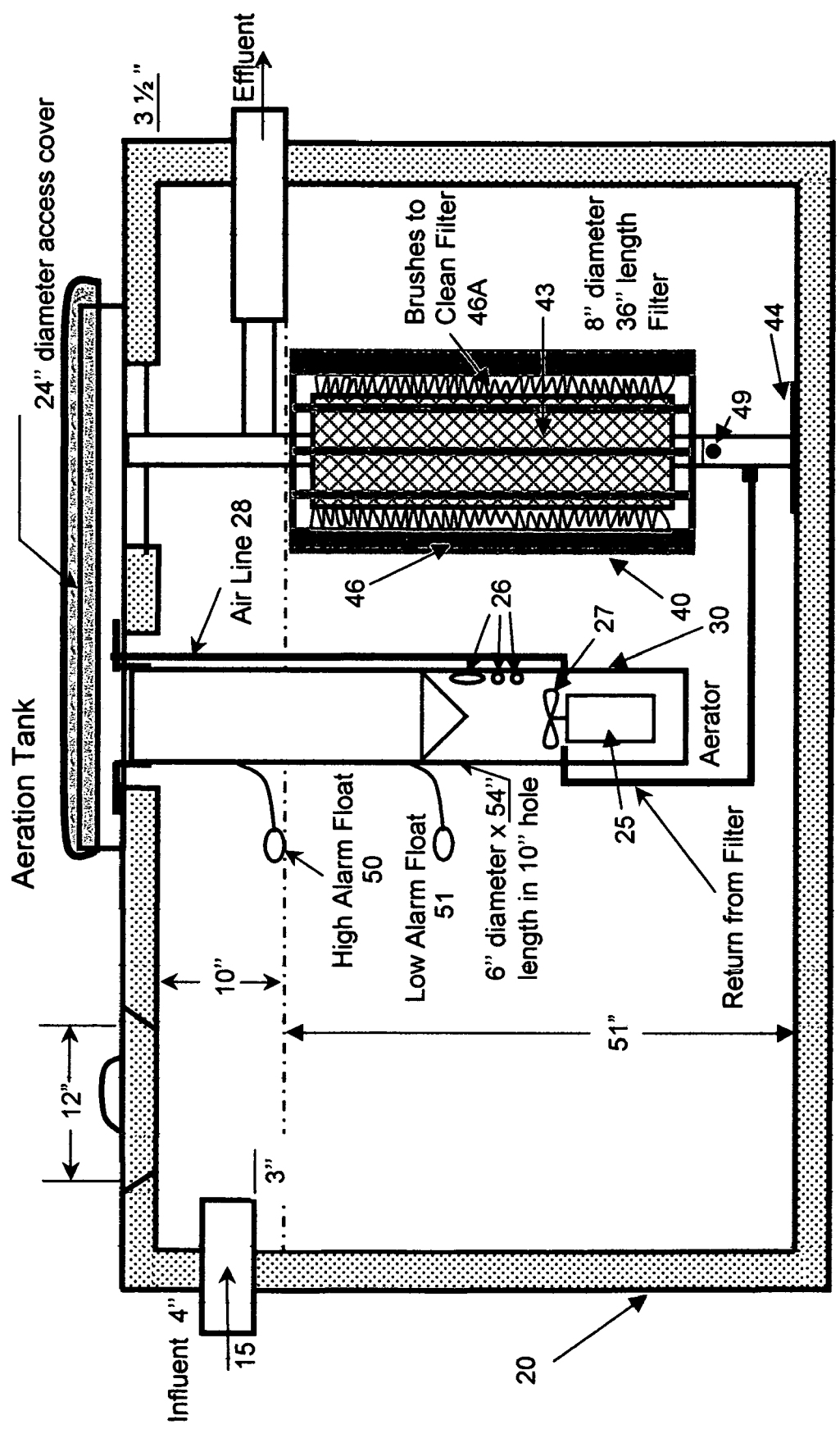
FIG. 2 is a view of the aerator apparatus which is suspended within the aeration tank and the filter that is supported on a base in the aeration tank.
Figure 3:
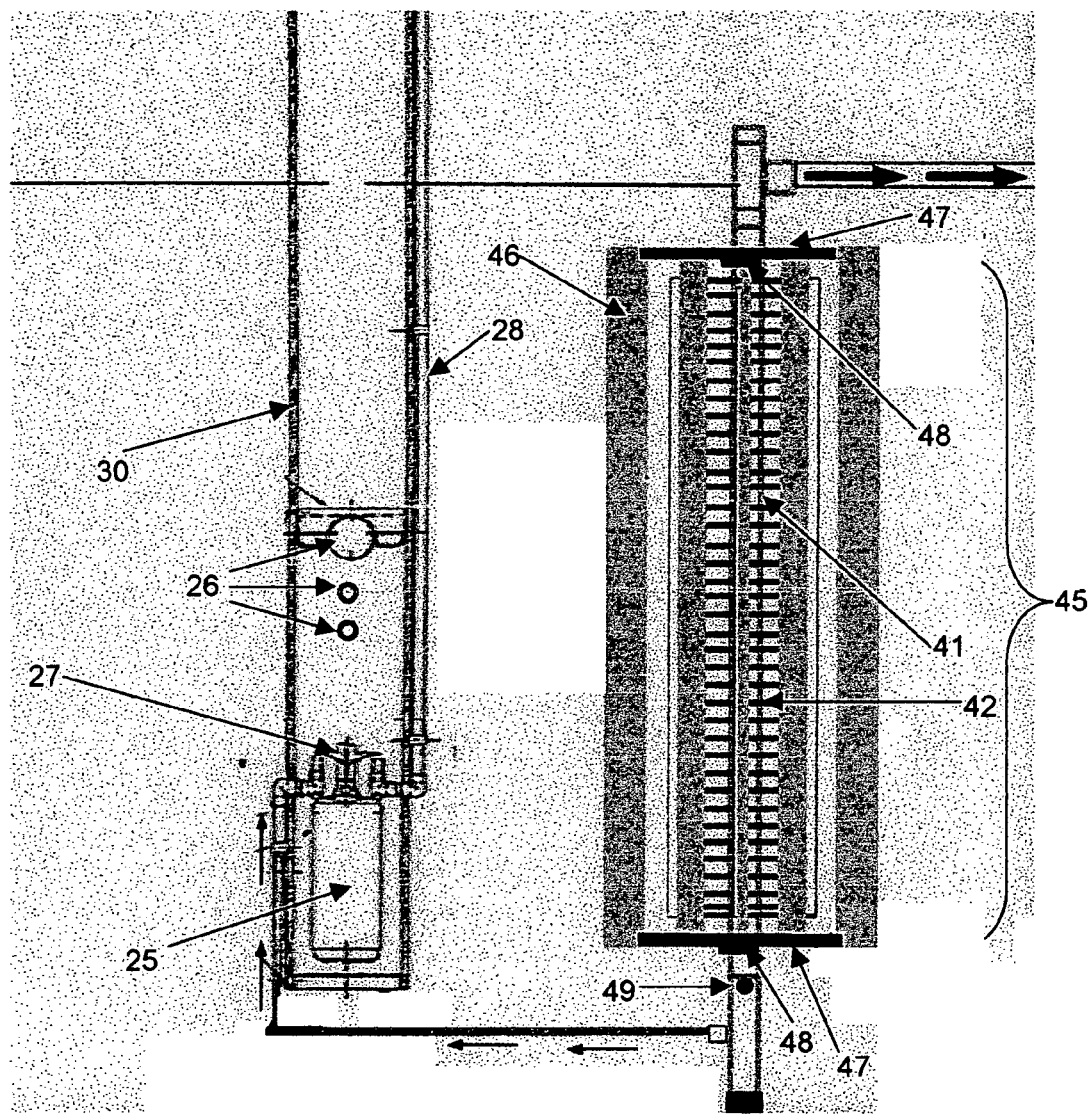
FIG. 3 is a partial cross-section view of the aerator and filter showing details.

Located in tank 20, adjacent to aerator unit 30, is the filter unit 40 which collects particulate solids and prevents them from leaving the tank. The slotted interior filter body 41 is a cylinder, such as a length of eight inch diameter PVC sleeve with sets of narrow (e.g. ⅛ inch) slots 42 formed though its wall in several arrays over the majority of its surface. A porous cloth element 43 (e.g. a "sock") is fitted over body 41. This filter cloth element is closed on one end and held in place on the other by a stainless steel clamp. Filter body 41 is supported on a stand structure 44 which in turn rests on the bottom of tank 20, with the body held in a stationary vertically extending orientation as shown in FIG. 2.

Surrounding the stationary sock covered body of the filter is a rotary paddle wheel assembly 45 having multiple paddle blades 46 extending between upper and lower plates 47. At least two oppositely spaced blades 46 have a brush 46A with nylon (or similar) bristles facing inward to contact the filter cloth. As the fluid jets from the aerator unit turn the paddle assembly, the brushes scrub the exterior of the filter cloth, element maintaining its porosity. The paddle assembly is supported, both top and bottom, by PVC bearings 48 that allow it to turn. Inside the slotted sleeve is the three inch PVC discharge pipe which receives flow from the filter cloth. The discharge line is designed to allow the aerator to re-circulate some of the filtered liquid back to the aerated tank. Recirculation is controlled by a ball check valve 49 that automatically closes when the aerator is not running. This ensures that water inside the three inch discharge line does not become stagnant. Also located in the aeration tank is a high level alarm float & switch 50 that is a safety device to indicate when the filter needs cleaned. A second float & switch, Low Level Alarm 51, prevents the motor from operating when tank 20 is empty. With normal loading, the filter should not need to be cleaned except when the septic tank needs to be pumped. supported, both top and bottom, by PVC bearings 48 that allow it to turn. Inside the slotted sleeve is the three inch PVC discharge pipe which receives flow from the filter cloth. The discharge line is designed to allow the aerator to re-circulate some of the filtered liquid back to the aerated tank. Recirculation is controlled by a ball check valve 49 that automatically:

The aerator 30 is constructed of a six inch PVC pipe and utilizes a submersible motor 25 for aerating and mixing. The aerator unit is placed in tank 20, as shown in FIG. 2, and the motor is connected to the control box 60 using #12 direct burial wire. All electrical connections for the motor and the high level alarm float are waterproof. The aerator motor 25 is controlled by a standard, commercially available, twenty minute interval, twenty-four hour time clock 61, incorporated in the system control. This clock should always indicate the correct time of day so the aeration cycles match actual daily loading patterns proscribed for the aeration sewage system. The aeration cycles are controlled by the time clock in the system control panel. The pins on the clock are pre-set by the installer to actuate the motor in a manner providing optimum operation of the system.

The control box 60 is installed in a sheltered location and includes two 10 amp circuit breakers protecting the aerator motor 25, alarm float 50, a 24 hour-20 minute interval timer 61, a green "run"light 62, a 12 volt transformer 63, and an audible alarm 64 with stop indicating red light 65 controlled by the high-level float 50 near the outlet from tank 20.

Technical & Operational Information

Figure 4:
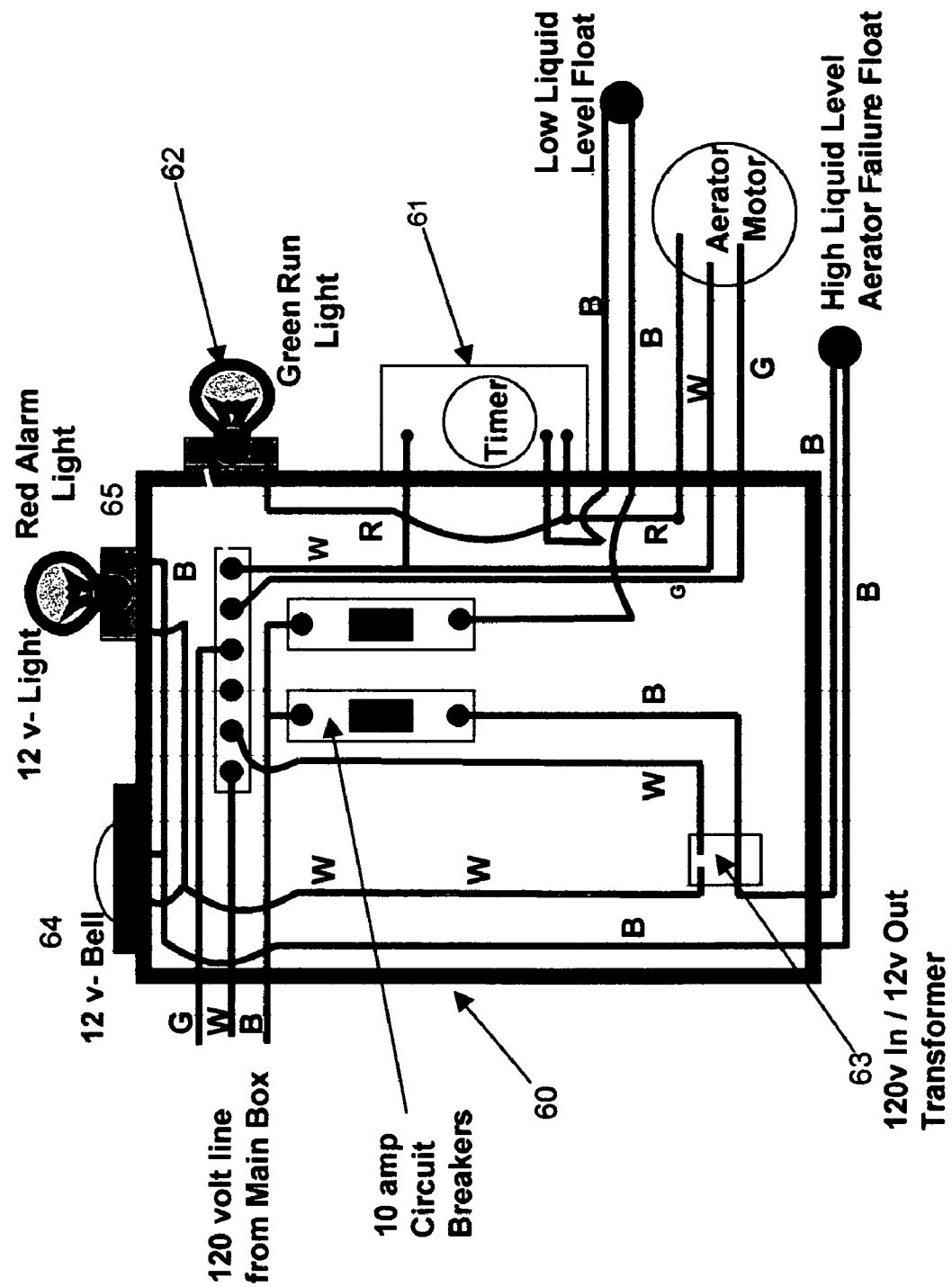
FIG. 4 is a system electrical schematic.
Figure 5:
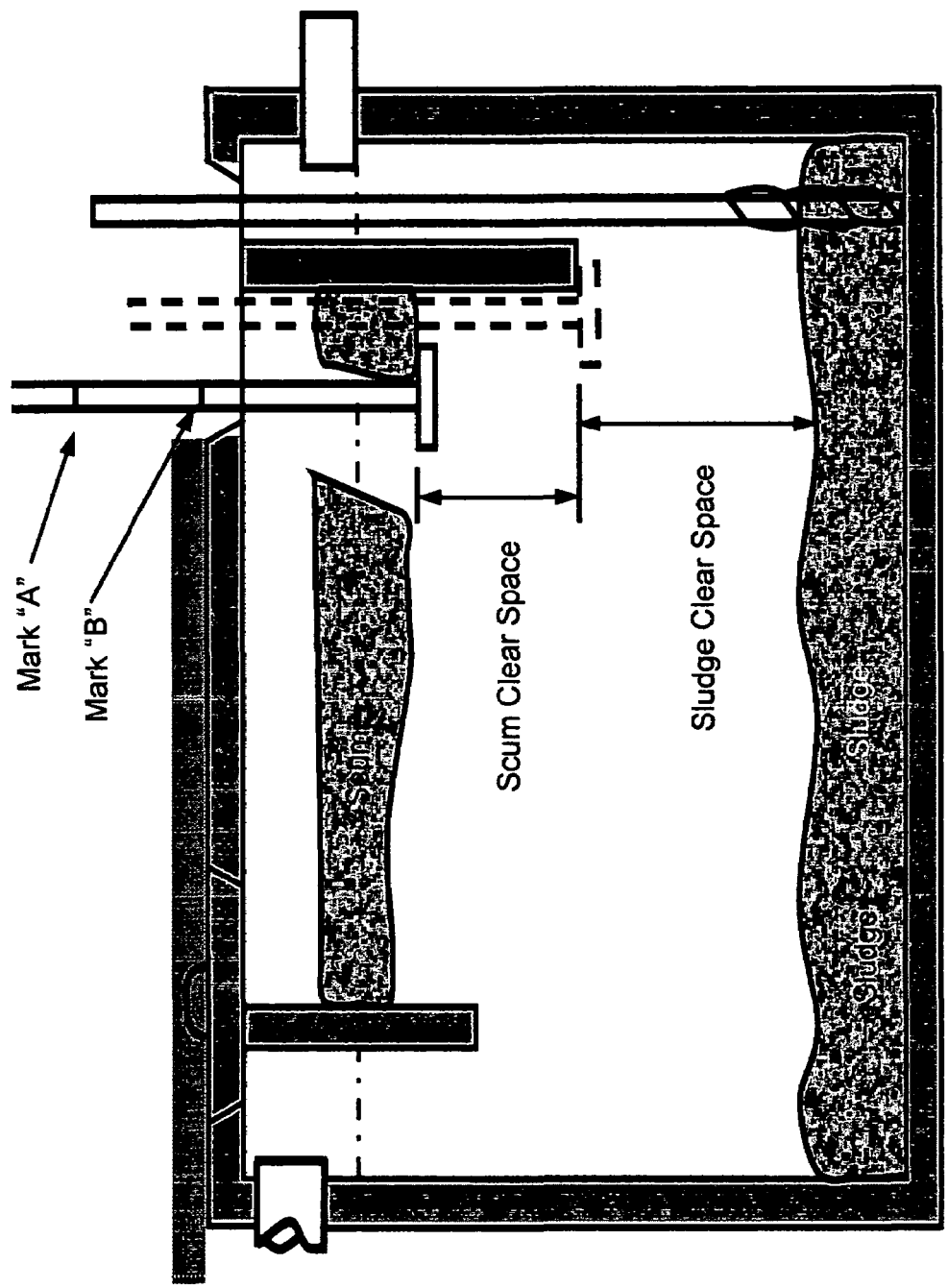
FIG. 5 is a cross-sectional view of the septic, or pretreatment, tank displaying cleaning procedures.

Unit will not operate and warning light is not on. If the aerator does not run when called for by the pins settings on the clock, make sure circuit breakers in the Control Panel are in the ON position. Check all connections as shown in the wiring diagram in FIG. 4. Use Required Safety Procedures When Working With Electrical Circuits.

Unit will not cycle properly. If the system does not cycle correctly, check that the clock pins are set for motor to operate and indicates the correct time.

The red warning light is on. This could indicate one of two conditions. Slide the clock switch to ON and remove top cover of system. Aerator should be running, if not, the motor has failed. If it is running then the filter has become plugged. For either condition, call the Installer.

System Maintenance: Every system will require some routine maintenance. This unit will give optimum performance by following the recommendations listed below:

Septic Tank: There are no known chemicals, yeast, bacteria, enzymes, or other substances capable of eliminating or reducing sludge or scum in a septic tank so that periodic cleaning is unnecessary. The septic tank is designed to retain heavy and light solids that must be eventually removed by pumping. Products claiming to eliminate periodic removal of solids usually do more harm than good. One household chemical that will help the anaerobic action in the tank is sodium bicarbonate (household baking soda). Adding baking soda to the tank will help neutralize acids produced by the anaerobic bacteria and will encourage the decay of sludge.

The septic tank 10 must be inspected periodically to determine the amount of accumulated scum and sludge. With a new system, an annual inspection is recommended until a rate of solids accumulation can be determined. After a pattern of accumulation is established, less frequent inspection may be permitted. If the solids build up until they carry over to the aeration tank, the performance of the aerator and the quality of the discharge will be adversely affected.

Septic Tank Inspection Procedure: Inspecting the septic tank is a procedure requiring only a few simple tools. The manufacturer of the tank should supply a drawing that shows all the dimensions of the tank. The purpose for checking the tank is to ensure sufficient dear space for the discharge To inspect, the tank locate and remove the cover over the discharge baffle. Most 1000 gallons septic tanks will be approximately 5 feet deep, so a measuring stick for determining the depth of sludge must be about 8 feet long. Using rubber bands, attach white paper towels over the last 2 feet of the stick and slowly lower that end to the bottom of the tank as shown. Accumulated sludge can be determined by measuring the dark stain on the paper towels. If the stain is 15 inches or more, then the tank should be pumped to maintain the proper Sludge Clear Space, between the top of the sludge and the bottom of the discharge baffle. Next, with a second stick attach a small flat wooden plate approximately 6 inches wide to its bottom, perpendicular to the stick. Slowly lower the stick through the scum and hook the bottom of the discharge outlet baffle or tee with the plate. Make a mark "A"on the stick, then slowly raise it until the weight of the scum on the wooden plate if felt. Make a second mark "B"on the stick. The distance between these two marks is the Scum Clear Space, between the bottom of the scum and the bottom of the discharge baffle. If it is less than 6 inches the tank must to be pumped.

The septic tank is pumped to remove solids, therefore, it is critical that all solids are removed and the tank inspected to insure solids have been removed. Be careful not to allow the septic tank pumping service to remove only the liquid, leaving solids in the tank. If the pumper has any capacity left in his hauling tank, then pump from the bottom of the aeration tank to fill the hauling tank to its capacity.

Filter: The paddle wheel assembly continuously cleans the filter cloth; therefore no routine maintenance is required. When the system is pumped, the filter should be gently sprayed to remove solids from the cloth. A soft long handle brush may be used to gently clean the filter if plugging occurs because of an unforeseen condition.

Other Considerations. The unit has been designed to treat domestic household waste. To operate properly certain items should be placed in the garbage rather than into the sewage treatment system. Specifically:

Grease—Collect grease in a container and dispose of it as a solid waste. Do not pour it down the drain. Even though the septic tank will collect the grease, pouring it down the drain will result in clogged lines, more frequent pumping and inefficient operation of the system.

Lint—Lint from an automatic washer should be disposed of in the garbage. Lint can not be treated in any home aeration unit.

Plastic Products, Rubber Products, Disposable Diapers, Sanitary Napkins, Mop Strings, Coffee Grounds, and Towels—are items which will not degrade in the system and will lead to pumping the system more often. All should be disposed of in the garbage as solid waste.

Home Water Treatment System Backwash—The backwash from iron removal and water softening treatment systems should not be connected to the system. The backwashes from these systems are high in salts and oxidizing agents that are detrimental to a biological treatment system. Dispose of these discharges in accordance to applicable regulations.

Excessive use of disinfectant and Odor Suppressant agents, such as Lysol, Clorox, and Pinesol, is not recommended, however normal use of these materials as recommended by the manufacturer will not harm the system.

It should be understood that dimensions stated herein are exemplary and provided for the purpose of example, and are not intended to limit the scope of the invention disclosed and claimed herein. Furthermore, while the methods herein described, and the forms of apparatus for carrying these methods into effect, constitute preferred embodiments of this invention, it is to be understood that the invention is not limited to these precise methods and forms of apparatus, and that changes may be made in either without departing from the scope of the invention, which is defined in the appended claims.

What is claimed is:

1. In an aerating type of sewage treatment system having a tank for receiving and holding a pool of sewage to be aerated, the method comprising
    circulating the sewage in the tank with an aerator device which includes a tube extending generally vertically within the tank and a power driven impeller in the tube which induces inflow and mixing of air into the flow through the tube and the pool within the tank,
    filtering a portion of the flow of sewage into the aerator device with a pervious filter element to collect particulate matter from the flow into the aerator device, and
    directing at least a portion of the flow through the aerator device against the filter screen to dislodge collected particulate matter therefrom so as to return to the pool and to further actuate a rotating device for brushing particulate matter from the filter element, and,
    directing part of the effluent passing through the filter screen to the discharge from the tank, and directing at least a portion of the remainder of such effluent back to the aerator device whereby the particulate matter is dispersed within the tank.

2. The method defined in claim 1, including
    continuing the mixing so as to keep the organic matter in the sewage in contact with microorganisms and air so the process remains aerobic.

3. An aerobic sewage treatment system including
    a treatment tank including an inlet for containing a pool of sewage to be treated,
    a tube supported within said tank, the ends of said tube opening into said tank, a motor driven aerator having an impeller supported for rotation within said tube, and a filter device supported within said tank adjacent to said tube to be impinged by a portion of the outgoing liquid stream from said aerator said filter device further comprising a rotating device actuated by said outgoing liquid stream for brushing particulate matter from said filter, said filter acting to collect particulate matter from the stream and the region of the pool surrounding the filter within said tank and to direct a portion of its filtered effluent out of said tank.

4. An aerobic sewage treatment system as defined in claim 3, further including, means supporting said aerator in a vertically disposed position generally centrally located in said tank and having an inlet for receiving sewage to be treated, said inlet being spaced upward from the bottom of said tank, and an outlet spaced slightly below said inlet, to form a pool substantially filling the tank,
    said filter device including a support stand with a supporting shaft spaced from and generally parallel to said aerator, a cylindrical center tube mounted on said support stand and connected to said outlet, a plurality of passages through the sides of said center tube, a pervious filter member covering the exterior of said center tube, a paddle structure supported for rotation on said center tube surrounding said filter member, and at least one cleansing brush means carried by said paddle structure and extending inward to contact the surface of said filter member,
    said aerator having at least one deflector means for acting to direct a stream from said aerator against said paddle structure to sweep said cleansing brush means about the exterior of said filter member,
    whereby the stream enters the spaces between blades of the paddle structure providing energy to rotate said paddle structure and also to impinge upon, and through, the filter member loosening particulate matter on the filter member to be brushed away during rotation of the filter structure such that particles gathered on the exterior of said filter member are caused to fall into the pool within the tank.

5. An aerobic sewage treatment system as defined in claim 4, wherein said filter member is a removable cloth sack fitted around said center tube of said filter device.

6. An aerobic sewage treatment system as defined in claim 5, wherein said aerator having an air inlet tube for admitting air from the exterior of said tank to a location adjacent the aerator impeller,
    sewage from the pool entering the bottom of said impeller tube is caused to flow upward by the rotating impeller and is aerated and deflected outwardly of said impeller tube to exit horizontally through an array of vertically spaced ports extending through the aerator tube, said spaced ports being located from opposite the upper portion of said filter to opposite the middle of said filter member, the effluent from said ports providing both the energy to rotate said paddle structure and also energy to create recirculating continuous flow of aerated liquid within said tank.

7. An aerobic sewage treatment system as defined in claim 6, wherein a recirculation tube extends from the lower end of said center tube of said filter device to said aerator, and a check valve is provided to control flow of filtered effluent from the interior of said central tube into said recirculation tube, said check valve functioning to prevent flow into said recirculation tube when said aerator is not running.

8. An aerobic sewage treatment system as defined in claim 4, wherein said aerator discharges into said tank and a portion of said aerator discharge is deflected toward said paddle structure to cause mixing of the liquid in the pool so the organic material remains in contact with the microorganisms and air so that the process remains aerobic.

* * * * *